Nov. 27, 1962   R. W. ROSENTHAL ET AL   3,066,165
PREPARATION OF ALKYL ALPHA-(HYDROXYMETHYL) ACRYLATES
Filed Feb. 27, 1962   2 Sheets-Sheet 1

INVENTORS.
ROBERT W. ROSENTHAL
REUBEN PROPER
NICHOLAS P. GRECO.
BY
their
ATTORNEY.

PRESSURE vs. TEMPERATURE AT CONSTANT YIELD.

PERCENT YIELD OF EHMA vs. PRESSURE AT CONSTANT TEMPERATURE

United States Patent Office 3,066,165
Patented Nov. 27, 1962

3,066,165
PREPARATION OF ALKYL ALPHA-(HYDROXY-METHYL) ACRYLATES
Robert W. Rosenthal, Reuben Proper, and Nicholas P. Greco, Pittsburgh, Pa., assignors to Koppers Company, Inc., a corporation of Delaware
Filed Feb. 27, 1962, Ser. No. 175,994
10 Claims. (Cl. 260—484)

This invention relates to a new method of making esters of alpha-(hydroxymethyl)acrylic acid. In one specific aspect, it relates to a method of making alkyl alpha-(hydroxymethyl)acrylates in the presence of a nickel carbonyl catalyst.

Alkyl alpha-(hydroxymethyl)acrylates are versatile trifunctional monomers which are capable of both addition and condensation polymerization. They combine in single molecules a readily polymerizable vinyl group and a reactive hydroxy group. In addition, the ester group provides a site at which the monomers of their polymers can be modified through hydrolysis, transesterification or amidation. These monomers are particularly useful in small amounts, e.g. 3–5% by weight, as copolymers in latices, e.g. styrene-butyl acrylate latex, to give increased adhesion and dyeability.

Various methods of preparing simple acrylic esters have been used heretofore. Reppe and his co-workers describe the so-called "stoichiometric method" whereby stoichiometric quantities of acetylene, nickel carbonyl, alcohol and hydrochloric acid are reacted at a temperature of 40–42° C. under normal pressure as represented by the equation:

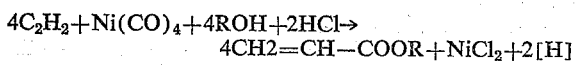

It was found that hydrogen was not evolved as a gas, but instead reacted to some extent with the double bond of the acrylate. Thus, in addition to obtaining decreased yields, the problem of separating the two esters was encountered.

Neher and Specht, U.S. 2,582,911, describe an improvement in preparing simple acrylate esters designated as the "semi-catalytic" method. It was discovered that after the reaction of acetylene, nickel carbonyl, alcohol, and acid became established, carbon monoxide could be reacted directly with acetylene and alcohol to make acrylates. At a temperature of up to 75° and at normal or slightly elevated pressure, the stoichiometric reaction acts to trigger the catalytic reaction, such that both reactions occur simultaneously. Unfortunately, when the stoichiometric reaction ceases, the catalytic synthesis also ceases.

Attempts to eliminate the stoichiometric reaction and run the catalytic reaction independently have not met with success. Dakli, U.S. 2,881,205, discloses that acrylic acid esters can be prepared by contacting acetylene, nickel carbonyl, alcohol, carbon monoxide and hydrochloric acid in the same reactor under normal pressure and at a temperature of 35–65° C. Conditions for starting the reaction involve charging the reactor with alcohol and nickel carbonyl and possibly also some acrylic ester and then introducing methanol, nickel carbonyl, gaseous hydrochloric acid, acetylene and carbon monoxide therein. The high concentrations of nickel carbonyl, initially introduced into the reactor, are maintained throughout the entire reaction. Such high concentrations, initially required and maintained throughout the reaction, illustrate the difficulty of conducting a truly catalytic reaction and cast doubt as to its successful achievement.

Quite surprisingly, we have discovered that the alkyl esters of the complex acrylic acid, alpha-(hydroxymethyl)acrylic acid, can be made by a truly catalytic method involving carboxylating propargyl alcohol in the presence of a catalytic amount of nickel carbonyl under limited conditions of temperature and corresponding pressure and reacting the intermediate alpha-(hydroxymethyl)acrylic acid with an alkanol to produce the ester, as shown by the following equations:

(1) 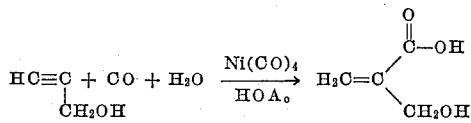

(2) 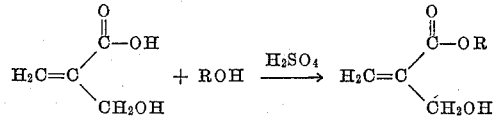

It is, therefore, an object of the present invention to provide a catalytic method of preparing alkyl esters of alpha-(hydroxymethyl)acrylic acid.

In accordance with our invention, the esters of alpha-(hydroxymethyl)-acrylic acid are prepared by reacting propargyl alcohol, carbon monoxide and water in the presence of an alkanol having from 1–8 carbon atoms, a weak organic acid and a catalytic amount of nickel carbonyl, which is added in small increments during the reaction. The carboxylation requires a temperature of 85–140° C. and a pressure for each temperature between the vapor pressure of the reactants other than carbon monoxide and a certain maximum pressure. After carboxylation, an esterification acid catalyst is added and the solution is refluxed to produce the ester. The catalyst is neutralized with a base, excess alkanol removed, water added, and the mixture extracted with an inert organic advent. The solvent is removed and the residue distilled under reduced pressure to yield the alpha-(hydroxymethyl)acrylate.

The invention is more clearly understood from the following description taken in conjunction with the accompanying drawings in which.

Figure 1:
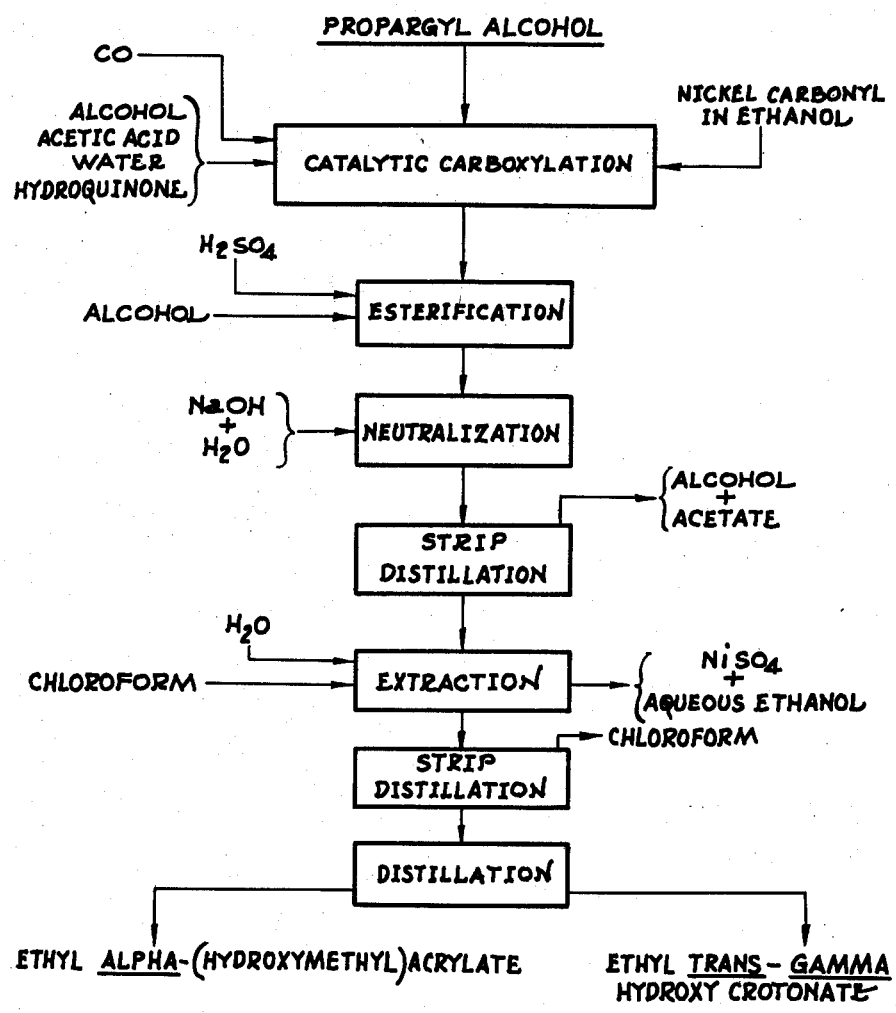
FIGURE 1 is a process flowsheet for the production of alkyl alpha-(hydroxymethyl)acrylate by the catalytic carboxylation of propargyl alcohol.

Referring to FIGURE 1, propargyl alcohol, acetic acid, alkanol, water and hydroquinone are introduced into an autoclave. After being purged with nitrogen and carbon monoxide, the autoclave is heated to a given temperature and a desired pressure of carbon monoxide is maintained. Then a mixture of nickel carbonyl in ethanol solvent is gradually fed into the autoclave in small increments over a period of time to control the temperature of the exothermic reaction. After the carboxylation has been completed, the mixture is cooled and transferred into a kettle. Alcohol and sulfuric acid are added, and the solution is refluxed to produce the esters and at the same time to remove residual nickel carbonyl. The reaction mixture is cooled and the sulfuric acid neutralized by the addition of aqueous caustic. Strip distillation under reduced pressure is used to remove excess alcohol and alkyl acetate. Water is then added and the mixture is extracted with chloroform. Nickel sulfate, found in the aqueous layer, may be reconverted to nickel carbonyl by being dissolved in ammonia and treated with carbon monoxide at an elevated temperature. The chloroform is readily removed by strip distillation under reduced pressure to leave a concentrate. The concentrate is distilled to recover three fractions: ethyl alpha-(hydroxymethyl)acrylate, ethyl trans-gamma-hydroxycrotonate and a residue.

Figure 2:
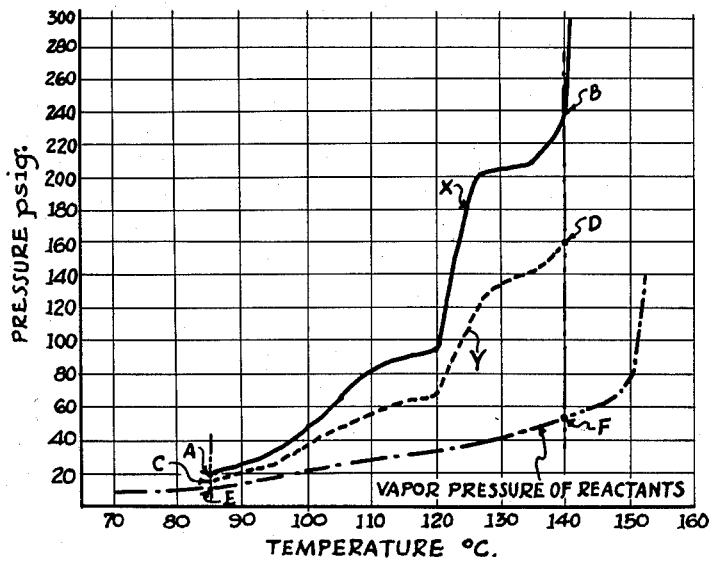
FIGURE 2 shows a graph of the ethyl alpha-(hydroxymethyl)acrylate under varying conditions of temperature and pressure.

In FIGURE 2 the effect of various conditions of temperature and pressure at constant yield is shown. Curve X represents the maximum operable pressure for each temperature under which the reaction proceeds; specifically, this is the so-called "go, no-go" curve. The yields obtained under conditions located on the curve are approximately 55–60% based on propargyl alcohol. If the pressure corresponding to an operable temperature is raised above the curve, the reaction immediately ceases. The minimum temperature and maximum practical temperature on the X curve at which catalytic carboxylation can be effected are represented by points A and B, respectively. Curve Y illustrates a preferred embodiment of the invention setting forth the minimum pressure for each temperature at which the reaction seems economically attractive at the present time, i.e. the pressures capable of producing a yield of approximately 30–35%, based on propargyl alcohol. Points C and D represent the minimum and maximum temperatures, respectively, on the Y curve at which catalytic carboxylation can be effected for reasons noted above. The bottom curve represents the vapor pressure of the reactants, propargyl alcohol, ethanol, acetic acid, water and hydroquinone. The minimum and maximum conditions of temperature and pressure at which catalytic carboxylation can be effected are represented on the curve by points E and F, respectively. FIGURE 2 shows that:

(1) Catalytic carboxylation of propargyl alcohol can be effected under conditions defined by the area ABFE between curve X and the curve of the vapor pressure of the reactants, and (2) Catalytic carboxylation of propargyl alcohol appears economically attractive, at the present time, under conditions defined by the area ABDC between curves X and Y.

Figure 3:
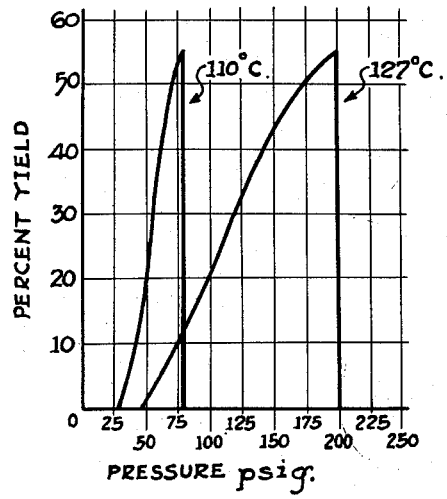
FIGURE 3 shows a graph of the percent yield of ethyl alpha-(hydroxymethyl)acrylate under varying pressures and at constant temperature.

FIGURE 3 shows the effect of the various pressures at constant temperature on the percent yield (based on propargyl alcohol) of ethyl alpha-(hydroxymethyl)acrylate. The two temperatures chosen are representative of the results obtained. It is observed from the graphical representation that the maximum yield of the product at each temperature is obtained under the maximum pressure and as the pressure is decreased, there is a corresponding decrease in yield.

CATALYTIC CARBOXYLATION

The temperature under which the reaction may be run is between 85 and 140° C. Below 85° C. the reaction does not proceed and temperatures above 140° C. are impractical because of decomposition of the catalyst and polymerization of the product. The preferred temperature is in the upper range between 110 and 135° C. since the rate of reaction varies directly with the temperature.

Pressure for the reaction, supplied by the carbon monoxide, must conform to specific pressure corresponding to the temperature. At each temperature there is a maximum pressure such that when the pressure is raised above this maximum, the reaction fails to proceed, as shown in FIGURE 2, curve X. Below certain pressures the reaction is not economically attractive, at the present time, as shown in FIGURE 2, curve Y. The yield varies directly with the pressure and the most favorable yield is obtained at the maximum pressure as shown in FIGURE 3. Operable pressures for our system are between the vapor pressure of the reactants curve and curve X, i.e. between 17 p.s.i.g. at 85° and 240 p.s.i.g. at 140° C. The pressure is given between curve Y and curve X; best results being obtained at 170–200 p.s.i.g. at 127° C.

The exact numerical values for reaction pressures defined by the curves of FIGURE 2 will vary somewhat, because of the change in the vapor pressure of the reactants, with the substitution of equivalent reactants, i.e. using a different alkanol or weak acid, or variation of the mole ratio of the reactants within the permissible limits. These changes, however, will not affect the general temperature-pressure relationship set forth in FIGURE 2.

Propargyl alcohol, either as such or in one of the equivalent forms, is an essential reactant in the preparation of alkyl alpha-(hydroxymethyl)acrylates. Equivalent forms of propargyl alcohol are the ether and acyl derivatives, such as methyl propargyl ether and propargyl acetate.

Pure or commercial grade carbon monoxide is fed into the reactor and must be present in an amount sufficient to provide at least the stoichiometric quantity required by the carboxylation. Another function of the carbon monoxide is to supply the necessary pressure for the reaction which should be maintained substantially constant.

A weak organic acid having a pKa of about 3–5 must be present in an amount sufficient to provide at least the stoichiometric quantity required by the carboxylation reaction. Acetic acid is preferred, as it is the least expensive and most readily available. Other organic acids, such as formic, propionic and butyric acids may also be used; but stronger acids, such as oxalic acid, are not useful. Further, the reaction does not take place in the presence of mineral acids, such as hydrochloric and sulfuric acids.

An alkanol is added to the reaction as a solvent and as a diluent. Useful alkanols are those having from 1–8 carbon atoms including methyl, ethyl, propyl, butyl, isobutyl and 2-ethylhexyl alcohol. Although alcohol is present during carboxylation, the free acid is formed in preference to the ester. In preparing a particular ester, the same alkanol should be used as solvent and in esterification.

To produce the alpla-(hydroxymethyl)acrylic acid, a stoichiometric quantity of water is required, as shown in Equation 1 supra.

Hydroquinone, although not essential to the reaction, may be added to prevent the formation of polymers. Other useful polymer inhibitors are ditertiary butyl cresol and the methyl ether of hydroquinone.

Nickel carbonyl is used as a catalyst to activate the reaction. It is desirable that the nickel carbonyl be diluted wtih an organic solvent, preferably the alkanol present in the reaction mixture, in approximately 10% solution to permit gradual addition of the catalyst to the reactants. Although at 100° C. nickel carbonyl vapor decomposes slowly into the metal and carbon monoxide, when it is diluted with carbon monoxide, it starts to decompose at about 140° C. and decomposes rapidly at 180° C. The catalyst should not, therefore, be used at temperatures above 140° C. To prevent the reaction from becoming violent, it is necessary that the catalyst be added gradually in small increments, whereby the exothermic nature of the reaction may be controlled. The useful catalytic amount of nickel carbonyl is approximately between 0.025 and 0.125 mole per mole of propargyl alcohol and the preferred range is between 0.04 and 0.06 mole.

The order of addition of the reactants is very important. Initially, propargyl alcohol, alkanol, weak organic acid, water and polymerization inhibitor, if desired, are mixed in an autoclave. The autoclave is purged with nitrogen and carbon monoxide, heated to a desired temperature and charged with carbon monoxide. After all the reactants are placed in the autoclave and the operable conditions of temperature and pressure achieved, nickel carbonyl is gradually fed into the autoclave. This order of addition demonstrates the catalytic character of the reaction; that is, prior to the addition of the catalyst, no reaction occurs, but by the addition of only minute amounts of catalyst, the reaction commences. The catalytic character of the process is further supported by the fact that a significantly greater quantity of carbon monoxide is absorbed than could possibly be supplied from the nickel carbonyl alone.

ESTERIFICATION

The desired alkanol is refluxed with the alpha-(hydroxymethyl)-acrylic acid in the presence of an acid catalyst to produce the ester. The total amount of alcohol, including that which was used as a diluent in the carboxylation step, must be sufficient to provide at least the stoichiometric quantity required by the esterification of both the alkanoic and alpha-(hydroxymethyl)acrylic acid. It is practical to have an excess of alcohol and it was found useful to use seven moles alcohol per mole of propargyl alcohol.

Any esterification acid catalyst may be used; sulfuric acid is the preferred acid, but sulfonic acid ion exchange resins or p-toluene sulfonic acid are equally effective.

A base, preferably aqueous caustic, is then added to neutralize the acid catalyst. Other useful bases include ammonia, potassium hydroxide, barium hydroxide and carbonates. Neutralization is, however, only about 90–95% complete, in order that some acid remains in the system to prevent later formation of emulsions during extraction.

RECOVERY OF THE PRODUCT

The product is concentrated to reduce the volume by strip distillation, which is preferably preformed on a steam bath under reduced pressure, such as may be readily obtained by using a water aspirator.

The product is further purified by extraction with a water-immiscible inert organic solvent. Useful solvents include hydrocarbons, e.g. petroleum ether; halohydrocarbons, e.g. chloroform, carbon tetrachloride, ethylene chloride; aromatics, e.g. benzene, toluene, chlorobenzene, xylene; alicyclics, e.g. cyclohexane. The solvent is then easily removed by strip distillation as described above.

The product alkyl alpha-(hydroxymethyl)acrylate is separated by distillation from its higher boiling isomer, alkyl trans-gamma-hydroxycrotonate; e.g. at 1 mm. ethyl alpha-(hydroxymethyl)acrylate distills at a temperature between 60–65° C. and ethyl trans-gamma-hydroxycrotonate distills between 85 and 95° C.

Our invention is further illustrated by the following examples:

Example I

A ten-gallon, stirring autoclave was charged with 95% ethanol (15 liters), 95% propargyl alcohol (2480 ml., 41 m.), acetic acid (2460 ml., 41 m.), water (50 g., 2.8 m.), and hydroquinone (12 g.). After being purged with nitrogen and carbon monoxide, the autoclave was heated to 127° C. and maintained at 200 p.s.i.g. of carbon monoxide. A mixture of nickel carbonyl (231 ml. in 1845 ml. of 95% ethanol) was gradually fed under pressure into the autoclave in 50–100 ml. increments for a period of about two hours. The exothermic reaction was kept at 127–130° by controlling the rate of addition of nickel carbonyl and occasional cooling. The absorption of carbon monoxide (305 p.s.i.g., 36 m.) started during the initial addition and was completed after about two hours. The reaction mixture was cooled to 70° and the contents (43.75 lbs.) was transferred into a kettle.

To four carboxylation batches (ca. 168 lbs.), 95% ethanol (18.82 lbs.) and sulfuric acid (98%, 8.62 lbs.) were added and the solution was refluxed for 15 hours at 73–76° in a 30-gallon, glass-lined kettle having an 8 ft., jacketed, stainless steel condenser (1" diameter) and two stainless steel, 15-gallon drums as receivers. A bromine trap was attached to the end of the condenser and kept there for about one hour until the cessation of fumes indicated that all residual nickel carbonyl had distilled out and reacted with the bromine. The reaction mixture was cooled and the sulfuric acid catalyst was 95% neutralized by the addition of aqueous caustic (17.4%, 29.6 lbs.). The excess ethanol and ethyl acetate were removed by strip-distillation over a period of 9.4 hours and the final temperature and pressure were 75° and 60 mm., respectively. Then water (12 gallons, 100 lbs.) was added to the kettle and the solution extracted with chloroform (2 x 50 lbs.). The aqueous ethanol layer was discarded, the chloroform extracts were put back into the kettle, and the chloroform removed by strip-distillation. The final temperature and pressure were 62° and 70 mm., respectively. The concentrate weighed 32.1 lbs.

The concentrate was continuously flash-distilled using a flask equipped with a Teflon stirring bar, an unpacked column (36" x 1") equipped with a total take-off head, a condenser with a fraction cutter attached to the take-off head, and a Dry Ice-cooled receiver. The concentrate was heated in an oil bath under continuous stirring. Keeping the rate of addition of the charge equal to the rate at which product was collected, approximately 0.5 gallon per hour was added under 4–10 mm. pressure and a pot temperature of 110–140° C. The flash-distillate distilled at 110–125° C. The residue (3.1 lbs.) accumulating in the pot was removed periodically for the purpose of keeping the pot temperature low and was recycled in the esterification step to produce more ester.

The flash-distillate (29.23 lbs.) was redistilled under a pressure of 1 mm. The yield obtained was 24.3 lbs. (52%) of ethyl alpha-(hydroxymethyl)acrylate, B.P. 55–60° (1 mm.), $n_D^{22}$ 1.4480–1.4490 and 5.1 lbs. (10.8%) of ethyl trans-gamma-hydroxycrotonate, B.P. 75–80° (1 mm.), $n_D^{22}$ 1.4580–1.4590. Another 4–5% yield of acrylate was obtained by recycling the residue. It was found that for this system the amount of nickel carbonyl was adequate and that although greater amounts could be used, no advantage in a corresponding increased yield would be obtained.

Example II

A one-gallon stirring autoclave was charged with 95% ethanol (400 ml.), water (16 ml.), acetic acid (120 g., 2.0 m.), and propargyl alcohol (112 g., 2.0 m.), and hydroquinone (0.1 g.) and purged with nitrogen and carbon monoxide. Thereafter the autoclave was heated to 127° and maintained under carbon monoxide pressure of 200 p.s.i.g. A mixture of nickel carbonyl (12 ml., 0.09 m.) in absolute alcohol (120 ml.) was fed in 5–10 ml. increments under pressure from a "Jerguson" gauge into the autoclave over a one hour period. The reaction was exothermic and required cooling to maintain the temperature. After two hours, the absorption, as measured from a calibrated vessel, was 160 p.s.i.g.

Concentrated sulfuric acid (5 ml., 0.18 eq.) was added to precipitate ionic nickel as nickel sulfate hexahydrate. The solid was filtered off, concentrated sulfuric acid (20 ml., 0.72 eq.) was added to the filtrate, and the solution was refluxed for 16 hours through a Soxhlet extractor, the thimble of which contained anhydrous magnesium sulfate. The reaction was cooled and twice the volume of water was added. Then 5 N sodium hydroxide (144 ml., 0.72 eq.) was added to neutralize the catalyst. The mixture was then strip-distilled until the volume was reduced to about 500 ml. Water (1 liter) was added and the solution was extracted with chloroform (4 x 300 ml.). The chloroform was strip-distilled and the residue distilled under reduced pressure through a 6 inch Vigreux column. There were obtained 136 g. (52% yield) of ethyl alpha-(hydroxymethyl)acrylate distilling at 65–70° (1 mm.) and 29 g. (11% yield) of ethyl trans-gamma-hydroxycrotonate distilling at 75–85° (1 mm.).

Example III

A one-gallon stirring autoclave was charged with 95% ethanol (400 ml.), water (16 ml.), acetic acid (120 g., 2.0 m.), hydroquinone (0.1 g.), and propargyl alcohol (112 g., 2.0 m.), and then purged with nitrogen and carbon monoxide. Thereafter the autoclave was pressured to 500 p.s.i.g. with carbon monoxide. A ten ml. increment of a mixture of nickel carbonyl (12 ml., 0.09 m.) in absolute alcohol (120 ml.) was fed under pressure into the autoclave.

The autoclave was then gradually heated to predetermined arbitrary temperatures. After thermal equilibrium had been attained, the pressure was gradually decreased until the reaction occurred, as evidenced by an exotherm and gas absorption. Then the pressure was increased to 500 p.s.i.g., the temperature raised, and the pressure again decreased to obtain another reading. The table below shows the results obtained.

TABLE I.—MAXIMUM PRESSURE FOR CARBOXYLATING PROPARGYL ALCOHOL AT VARIOUS TEMPERATURES

| Temperatures, °C. | Maximum CO pressure, p.s.i.g. |
|---|---|
| <85 | No reaction |
| 85 | 20 |
| 90 | 25 |
| 95 | 32 |
| 100 | 50 |
| 105 | 65 |
| 110 | 80 |
| 115 | 90 |
| 120 | 95 |
| 122 | 130 |
| 124 | 160 |
| 127 | 200 |
| 135 | 210 |
| 140 | 240 |
| 145 | >500 |

*Example IV*

Repeating the procedure of Example II, with the exception that the pressure was varied. The following table shows the percentage yields of ethyl alpha-(hydroxymethyl)acrylate (EHMA) and ethyl trans-gamma-hydroxycrotonate (EHC) obtained.

TABLE II.—YIELD OF EHMA AT 127° WITH VARIOUS PRESSURES

| Pressure, p.s.i.g. | Percent Yield | | |
|---|---|---|---|
| | EHMA | EHC | Residue |
| 200 | 55 | 6 | 10 |
| 175 | 50 | 8 | 12 |
| 150 | 43 | 5 | 13 |
| 130 | 35 | 6 | 19 |
| 125 | 32 | 6 | 23 |

*Example V*

Repeating the procedure of Example IV except that the pressure was varied for each operable temperature to obtain a minimum yield of 35% ethyl alpha-(hydroxymethyl)acrylate. The results obtained are given in the following table:

TABLE III.—MINIMUM PRESSURE FOR CARBOXYLATING PROPARGYL ALCOHOL AT VARIOUS TEMPERATURES

| Temperatures, °C. | Minimum CO pressure, p.s.i.g. |
|---|---|
| 85 | 17 |
| 90 | 21 |
| 95 | 26 |
| 100 | 37 |
| 105 | 47 |
| 110 | 57 |
| 115 | 64 |
| 120 | 69 |
| 122 | 89 |
| 127 | 130 |
| 135 | 140 |
| 140 | 160 |

*Example VI*

A one-gallon stirring autoclave was charged with 95% ethanol (500 ml.), water (16 ml.), acetic acid (120 g., 2.0 m.), propargyl alcohol (112 g., 2.0 m.), and hydroquinone (0.1 g.) and then purged with nitrogen and carbon monoxide. Thereafter, the autoclave was gradually heated and the vapor pressure of the reactants recorded at various temperatures. The results obtained are recorded in the following table:

TABLE IV.—VAPOR PRESSURE OF REACTANTS EXCLUDING CARBON MONOXIDE

| Temperatures, °C. | Pressure, p.s.i.g. |
|---|---|
| 70 | 9 |
| 75 | 9 |
| 80 | 10 |
| 85 | 12 |
| 90 | 15 |
| 95 | 17 |
| 100 | 20 |
| 105 | 23 |
| 110 | 28 |
| 115 | 30 |
| 120 | 33 |
| 125 | 37 |
| 127 | 39 |
| 130 | 41 |
| 135 | 49 |
| 140 | 55 |
| 145 | 60 |
| 150 | 75 |
| 155 | 140 |

*Example VII*

A one-gallon stirring autoclave was charged with propargyl alcohol (56 g., 1 m.), acetic acid (60 g., 1 m.), 95% ethanol (372 ml.), absolute ethanol (200 ml.), nickel bromide (22 g., 0.1 m.) and hydroquinone (0.1 g.). The system was purged with nitrogen and then heated to 127° C. and pressured with carbon monoxide to between 80–150 p.s.i.g., but no absorption was observed. Further attempts at 135° (160 p.s.i.g.) and 180° (300 p.s.i.g.), were equally unsuccessful.

*Example VIII*

In a one-gallon stirred autoclave were placed propargyl alcohol (56 g., 1 m.), acetic acid (60 g., 1 m.), 95% ethanol (692 ml.), and nickel acetate tetrahydrate (148 g., 0.6 m.). The system was heated for four hours at 127° and under 200 p.s.i.g. carbon monoxide pressure but no absorption was observed.

*Example IX*

In a one-gallon stirring autoclave were placed Raney nickel (7.3 g., 0.12 g. at.) and 500 ml. of absolute ethanol. The system was heated one hour at 50° under 150 p.s.i.g. carbon monoxide, but there was no absorption. The autoclave was then charged with propargyl alcohol (56 g., 1 m.), acetic acid (60 g., 1 m.), and water (18 g., 1 m.). The system was heated for 90 minutes at 127° under 200 p.s.i.g. carbon monoxide pressure but no absorption was observed.

*Example X*

In a one-gallon stirred autoclave were placed propargyl acetate (98 g., 1 m.), acetic acid (60 g., 1 m.), 95% ethanol (372 ml.), absolute ethanol (100 ml.) and hydroquinone (0.1 g.). The system was purged with nitrogen and carbon monoxide and then pressured with carbon monoxide and heated so that at 126° C. the pressure was 200 p.s.i.g. Nickel carbonyl (0.05 m. in 100 ml. absolute ethanol) was added in small increments for one hour from a "Jerguson" gauge connected to the apparatus. It was noted that a reaction had occurred, as demonstrated by an exotherm and pressure decrease of 65 p.s.i.g. (0.8 m. carbon monoxide in two hours). The contents were mixed with sulfuric acid (10 ml.) and refluxed for 17 hours in a system containing a Soxhlet filled with anhydrous magnesium sulfate. The solution was cooled, the acid neutralized with 5 N sodium hydroxide, and the ethanol strip-distilled. Water was added and the mixture was extracted with chloroform (3 x 200 ml.) and the chloroform strip-distilled. Distillation of the residue yielded 54 g. (41% yield) of ethyl alpha(hydroxymethyl)acrylate boiling at 65–70°/1 mm. and 3 g. of higher boilers, presumably ethyl trans-gamma-hydroxycrotonate.

*Example XI*

In a one-gallon stirred autoclave were placed propargyl benzoate (160 g., 1 m.), acetic acid (60 g., 1 m.), 95% ethanol (372 ml.), and hydroquinone (0.1 g.). The system was purged with nitrogen and carbon monoxide and then pressured with enough carbon monoxide so that at 128° the pressure was 200 p.s.i.g. Then nickel carbonyl (0.045 m. in 200 ml. of absolute ethanol) was added in small increments for one hour from a "Jerguson" gauge. After one hour, an absorption of 55 p.s.i.g. carbon monoxide was recorded. The system was cooled to room temperature and carefully vented. One half of the contents was mixed with concentrated sulfuric acid (10 ml.) and absolute ethanol (500 ml.) and the solution was refluxed for 24 hours. The reaction mixture was neutralized with sodium hydroxide solution and stripped of low boiling materials. The liquid residue was mixed with twice its volume of water and extracted with chloroform (3 x 200 ml.). The chloroform solution was stripped of solvent and the residue was distilled under reduced pressure to yield 72 ml. of product at 60–70° (1 mm.), $n_D^{25}$ 1.4860. The product was redistilled in an attempt to separate ethyl benzoate from ethyl alpha-(hydroxymethyl)acrylate, but the attempt was unsuccessful. The product was analyzed for double bond content by the mercuric acetate method and was found to contain 30% ethyl alpha-(hydroxymethyl)acrylate. The over-all yield of ethyl alpha-(hydroxymethyl)acrylate was 22 g., equivalent to 34%.

We claim:

1. Method of making alkyl alpha-(hydroxymethyl)-acrylates, the alkyl group having from 1–8 carbon atoms, comprising forming a reaction mixture consisting essentially of a member selected from the group consisting of propargyl alcohol, lower alkyl propargyl ethers and lower alkyl propargyl esters, an alkanol having from 1–8 carbon atoms, a weak organic acid and water, said acid and water being present in at least stoichiometric quantities based on the number of moles of propargyl alcohol present, subjecting said mixture to a positive pressure of carbon monoxide, adding incrementally thereto nickel carbonyl in an amount sufficient to maintain a catalytic concentration of nickel carbonyl as the reaction progresses, maintaining during the reaction a temperature of 85–140° C. and a carbon monoxide pressure above the vapor pressure of the other reactants, but less than that at which the reaction ceases, releasing the positive pressure on the system, adding a catalytic amount of an esterification acid catalyst, refluxing the reaction mixture containing said alkanol in an amount sufficient to provide at least the stoichiometric quantity required for esterification, neutralizing the acid catalyst with a base, and recovering the alkyl alpha-(hydroxymethyl) acrylate from the reaction mixture.

2. Method of making alkyl alpha-(hydroxymethyl)-acrylates, the alkyl group having from 1–8 carbon atoms, comprising forming a reaction mixture consisting essentially of propargyl alcohol, an alkanol having from 1–8 carbon atoms, a weak organic acid and water, said acid and water being present in at least stoichiometric quantities based on the number of moles of propargyl alcohol present, subjecting said mixture to a positive pressure of carbon monoxide, adding incrementally thereto nickel carbonyl in an amount sufficient to maintain a catalytic concentration of nickel carbonyl as the reaction progresses, maintaining during the reaction a temperature of 85–140° C. and a carbon monoxide pressure above the vapor pressure of the other reactants, but less than that at which the reaction ceases, releasing the positive pressure on the system, adding a catalytic amount of an esterification acid catalyst, refluxing the reaction mixture containing said alkanol in an amount sufficient to provide at least the stoichiometric quantity required for esterification, neutralizing the acid catalyst with a base, and recovering the alkyl alpha-(hydroxymethyl)acrylate from the reaction mixture.

3. Method of making ethyl alpha-(hydroxymethyl)-acrylate comprising forming a reaction mixture consisting essentially of propargyl alcohol, ethanol, a weak organic acid and water, said acid and water being present in at least stoichiometric quantities based on the number of moles of propargyl alcohol present, subjecting said mixture to a positive pressure of carbon monoxide, adding incrementally thereto nickel carbonyl in an amount sufficient to maintain a catalytic concentration of nickel carbonyl as the reaction progresses, maintaining during the reaction a temperature of 85–140° C. and a carbon monoxide pressure above the vapor pressure of the other reactants, but less than that at which the reaction ceases, releasing the positive pressure on the system, adding a catalytic amount of an esterification acid catalyst, refluxing the reaction mixture containing said ethanol in an amount sufficient to provide at least the stoichiometric quantity required for esterification, neutralizing the acid catalyst with a base, and recovering ethyl alpha-(hydroxymethyl)acrylate from the reaction mixture.

4. Method according to claim 3 wherein the esterification acid catalyst is sulfuric acid and the base is sodium hydroxide.

5. Method according to claim 3 wherein the temperature and carbon monoxide pressure is defined by the area ABDE between curve X and curve Y in FIGURE 2.

6. In the carboxylation of an acetylenic alcohol, the improvement comprising forming a reaction mixture consisting essentially of a member selected from the group consisting of propargyl alcohol, lower alkyl propargyl ethers, and lower alkyl propargyl esters, an alkanol having from 1–8 carbon atoms, a weak organic acid and water, subjecting said mixture to a positive pressure of carbon monoxide, adding incrementally thereto nickel carbonyl in an amount sufficient to maintain a catalytic concentration of nickel carbonyl as the reaction progresses, and maintaining during the reaction a temperature of 85–140° C. and a carbon monoxide pressure above the vapor pressure exerted by the other reactants but less than that at which the reaction ceases.

7. In the carboxylation of an acetylenic alcohol, the improvement comprising forming a reaction mixture consisting essentially of propargyl alcohol, an alkanol having from 1–8 carbon atoms, a weak organic acid and water, subjecting said mixture to a positive pressure of carbon monoxide, adding incrementally thereto nickel carbonyl in an amount sufficient to maintain a catalytic concentration of nickel carbonyl as the reaction progresses, and maintaining during the reaction a temperature of 85–140° C. and a carbon monoxide pressure above the vapor pressure exerted by the other reactants but less than that at which the reaction ceases.

8. In the carboxylation of a propargyl alcohol, the improvement comprising forming a reaction mixture consisting essentially of propargyl alcohol, ethanol, acetic acid and water, subjecting said mixture to a positive pressure of carbon monoxide, adding incrementally thereto nickel carbonyl in an amount sufficient to maintain a catalytic concentration of nickel carbonyl as the reaction progresses, and maintaining during the reaction a temperature and a carbon monoxide pressure as defined by the area ABDC between curve X and curve Y in FIGURE 2.

9. In the carboxylation of propargyl alcohol, the improvement comprising forming a reaction mixture consisting essentially of propargyl alcohol, ethanol, acetic acid and water, subjecting said mixture to a positive pressure of carbon monoxide, adding incrementally thereto nickel carbonyl in an amount sufficient to maintain a catalytic concentration of nickel carbonyl as the reaction progresses, and maintaining during the reaction a temperature as defined by the area ABFE between curve X and the curve of the vapor pressure of the reactants in FIGURE 2.

10. In the carboxylation of propargyl alcohol, the improvement comprising forming a reaction mixture consisting essentially of propargyl alcohol, ethanol, acetic acid and water, said acid and water being present in at least stoichiometric quantities, based on the propargyl alcohol, subjecting said mixture to a positive pressure of carbon monoxide, adding incrementally thereto nickel carbonyl in an amount sufficient to maintain a concentration of nickel carbonyl between 0.025–0.125 mole per mole of propargyl alcohol as the reaction progresses, and maintaining during the reaction a temperature of about 127° C. and a carbon monoxide pressure of between 175–200 p.s.i.g.

References Cited in the file of this patent
UNITED STATES PATENTS
2,613,222     Specht et al. _____ Oct. 7, 1952